(12) United States Patent
Seaman

(10) Patent No.: US 10,367,769 B2
(45) Date of Patent: Jul. 30, 2019

(54) PROCESSING OF EMAIL BASED ON SEMANTIC RELATIONSHIP OF SENDER TO RECIPIENT

(71) Applicant: International Business Machines Corporation, Armonk, NY (US)

(72) Inventor: Mark J. Seaman, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 640 days.

(21) Appl. No.: 14/882,525

(22) Filed: Oct. 14, 2015

(65) Prior Publication Data

US 2016/0105384 A1    Apr. 14, 2016

Related U.S. Application Data

(63) Continuation of application No. 12/642,947, filed on Dec. 21, 2009, now Pat. No. 9,203,649.

(51) Int. Cl.
G06F 15/16 (2006.01)
H04L 12/58 (2006.01)
G06Q 10/10 (2012.01)

(52) U.S. Cl.
CPC ........... *H04L 51/18* (2013.01); *G06Q 10/107* (2013.01); *H04L 51/12* (2013.01); *H04L 51/14* (2013.01); *H04L 51/24* (2013.01)

(58) Field of Classification Search
CPC ....... G06Q 10/107; H04L 51/12; H04L 51/14; H04L 51/18; H04L 51/24
See application file for complete search history.

(56) References Cited

U.S. PATENT DOCUMENTS

| | | | |
|---|---|---|---|
| 6,400,810 B1 | 6/2002 | Skladman et al. | |
| 6,643,687 B1* | 11/2003 | Dickie | G06Q 10/107 709/206 |
| 7,328,241 B2* | 2/2008 | Ribak | G06Q 10/107 709/204 |
| 8,601,080 B2 | 12/2013 | O'Sullivan et al. | |
| 2002/0103870 A1* | 8/2002 | Shouji | G06F 17/2264 709/206 |
| 2002/0133555 A1 | 9/2002 | Hall et al. | |
| 2003/0131063 A1* | 7/2003 | Breck | H04L 51/12 709/206 |
| 2005/0149622 A1 | 7/2005 | Kirkland et al. | |
| 2005/0204001 A1* | 9/2005 | Stein | G06Q 10/107 709/206 |

(Continued)

*Primary Examiner* — Cheikh T Ndiaye
(74) *Attorney, Agent, or Firm* — Lieberman & Brandsdorfer, LLC

(57) ABSTRACT

Embodiments are provided for processing received electronic mail messages. A received message is processed based upon a set of rules made up of at least first and second sets of rules. The processing includes ascertaining a property derived from the received message and determining a set of rules associated with the ascertained property. The received message is processed corresponding to at least one rule in the first set of rules if the ascertained property is associated with the first set of rules, and the received message is processed corresponding to at least one rule in the second set of rules if the ascertained property is associated with the second set of rules. The received message is communicated to a recipient based on the at least one rule.

20 Claims, 4 Drawing Sheets

(56) References Cited

U.S. PATENT DOCUMENTS

| | | | |
|---|---|---|---|
| 2009/0210497 A1* | 8/2009 | Callanan | H04L 51/04 709/206 |
| 2009/0248819 A1* | 10/2009 | Hutchison | H04L 51/00 709/206 |
| 2010/0211644 A1* | 8/2010 | Lavoie | G06Q 10/107 709/206 |
| 2010/0262917 A1 | 10/2010 | Hardy et al. | |
| 2013/0332540 A1* | 12/2013 | Vadhavkar | H04L 51/04 709/206 |

* cited by examiner

PROCESSING OF EMAIL BASED ON SEMANTIC RELATIONSHIP OF SENDER TO RECIPIENT

CROSS REFERENCE TO RELATED APPLICATION(S)

This application is a continuation patent application claiming the benefit of the filing date of U.S. patent application Ser. No. 12/642,947 filed on Dec. 21, 2009 and titled "Processing of Email Based on Semantic Relationship of Sender to Recipient" now pending, which is hereby incorporated by reference.

BACKGROUND OF THE INVENTION

Technical Field

This invention relates to processing electronic mail messages based upon the relationship between the sender and the recipient. More specifically, the invention relates to establishing rules based upon the relationship and processing the messages responsive to the rules.

Description of the Prior Art

Electronic mail (hereinafter referred to as "email") is a form of digital message exchange, and more specifically is the transmission of messages over a communications network. Each message includes content, an author address, and at least one recipient address. With the proliferation of email, there have been issues with electronic junk mail and other forms of unsolicited emails. It is known in the art, that processing of unsolicited emails and junk mail messages can become burdensome and occupy network bandwidth.

A variety of tools and techniques have been developed to mitigate receipt and processing of unsolicited email and junk mail. These tools are limited to processing email messages based upon the sender's name, the subject line, and/or message content. Based upon the limited processing available, the tools may recognize a message as unsolicited and will either remove the message from the recipient's inbox or employ protocols to divert the message to a location different from the recipient's inbox. FIG. 1 is a prior art flow chart (100) demonstrating a process for classifying email. Upon receipt of the email by the server (102), the following fields of the message are identified: sender address (104), sender name (106), and subject line (108). Based upon the information in these three fields, it is determined if the email should be classified as junk mail (110). A positive response to the determination at step (110) assigns the junk mail classification to the email and places the email in a junk mail folder, which is a folder separate from the inbox and accommodates all junk mail messages (112). Conversely, following a negative response to the determination at step (110), it is determined if the email is an unsolicited message (114). Similar to the determination at step (110), a positive response to the determination at step (114) assigns the unsolicited message classification to the email and places the email in an unsolicited message folder, which is a folder separate from both the inbox and junk mail folder. The inbox is referred to herein as a folder or directory in a recipient's application that receives and holds an email. In one embodiment, all unsolicited messages are never received in the recipient's electronic mail system. Following a negative response to the determination at step (114), the email is sent to the recipient and is received in the inbox of the recipient (118). Similarly, in one embodiment, all messages are received in the recipient inbox and followed by processing for junk or unsolicited message status, after which they are removed from the inbox. Accordingly, the prior art tools separate email into at least two categories and limit placement of email determined to be neither unsolicited message nor junk in the recipient's inbox.

The prior art tools do not address categorizing email that is not unsolicited email or junk. While it is beneficial to remove unsolicited message and junk mail from a recipient's inbox, issues remain with classifying solicited messages that are actually received by the recipient. Different received email messages may have different levels of importance. More specifically, some messages may be determined to require an immediate read, and others may require different levels of response times. Levels of importance may be appropriate in both business and non-business environments. Current email programs allow automated processing based on sender's email address or keywords in the subject line, but do not permit processing email based on the relationship between the sender and recipient. For example, with today's email programs, you could write a rule that states if a message arrives from my manager's email address, forward it to my pager. However, this rule is not based upon the semantic relationship between the two parties and it will not work if you get a new manager or if you transfer to a new department. Accordingly, there is a need for applying a relationship of the sender to the user to classify the received message and to convey the message to the recipient based upon the importance of the message and/or the semantic relationship of the sender and recipient.

SUMMARY OF THE INVENTION

This invention comprises a method, system, and article of manufacture for processing electronic communication based upon a relationship between the recipient and the sender.

In one aspect of the invention, a computer system is provided with a processor in communication with memory. A manager processed a received electronic mail message based upon a set of rules. The set of rules, which comprise at least first and second sets of rules, are based upon a semantic relationship derived from the received message. Processing the received message includes the manager to ascertain a property derived from the received message and determine a set of rules associated with the ascertained property. In response to determining that the ascertained property is associated with the first set of rules, the received message is processed corresponding to at least one rule in the first set of rules. In response to determining that the ascertained property is associated with the second set of rules, the received message is processed corresponding to at least one rule in the second set of rules. The received message is communicated to a recipient based on the at least one rule.

In another aspect of the invention, a computer implemented method is provided for processing electronic communication. The method includes processing a received electronic mail message based upon a set of rules. The set of rules, which comprise at least first and second sets of rules, are based upon a semantic relationship derived from the received message. Processing the received message includes ascertaining a property derived from the received message and determining a set of rules associated with the ascertained property. In response to determining that the ascertained property is associated with the first set of rules, the received message is processed corresponding to at least one rule in the first set of rules. In response to determining that the ascertained property is associated with the second set of rules, the received message is processed corresponding to at least one rule in the second set of rules. The received message is communicated to a recipient based on the at least one rule.

In yet another aspect of the invention, a computer program product is provided. The computer program product includes a computer-readable storage medium having computer readable program code embodied therewith. The program code is executable by a processor to process a received electronic mail message based upon a set of rules. The set of rules, which comprise at least first and second sets of rules, are based upon a semantic relationship derived from the received message. Processing the received message includes program code to ascertain a property derived from the received message and determine a set of rules associated with the ascertained property. In response to determining that the ascertained property is associated with the first set of rules, the received message is processed corresponding to at least one rule in the first set of rules. In response to determining that the ascertained property is associated with the second set of rules, the received message is processed corresponding to at least one rule in the second set of rules. The received message is communicated to a recipient based on the at least one rule.

Other features and advantages of this invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention unless otherwise explicitly indicated. Implications to the contrary are otherwise not to be made.

DESCRIPTION OF THE PREFERRED EMBODIMENT

Figure 1:
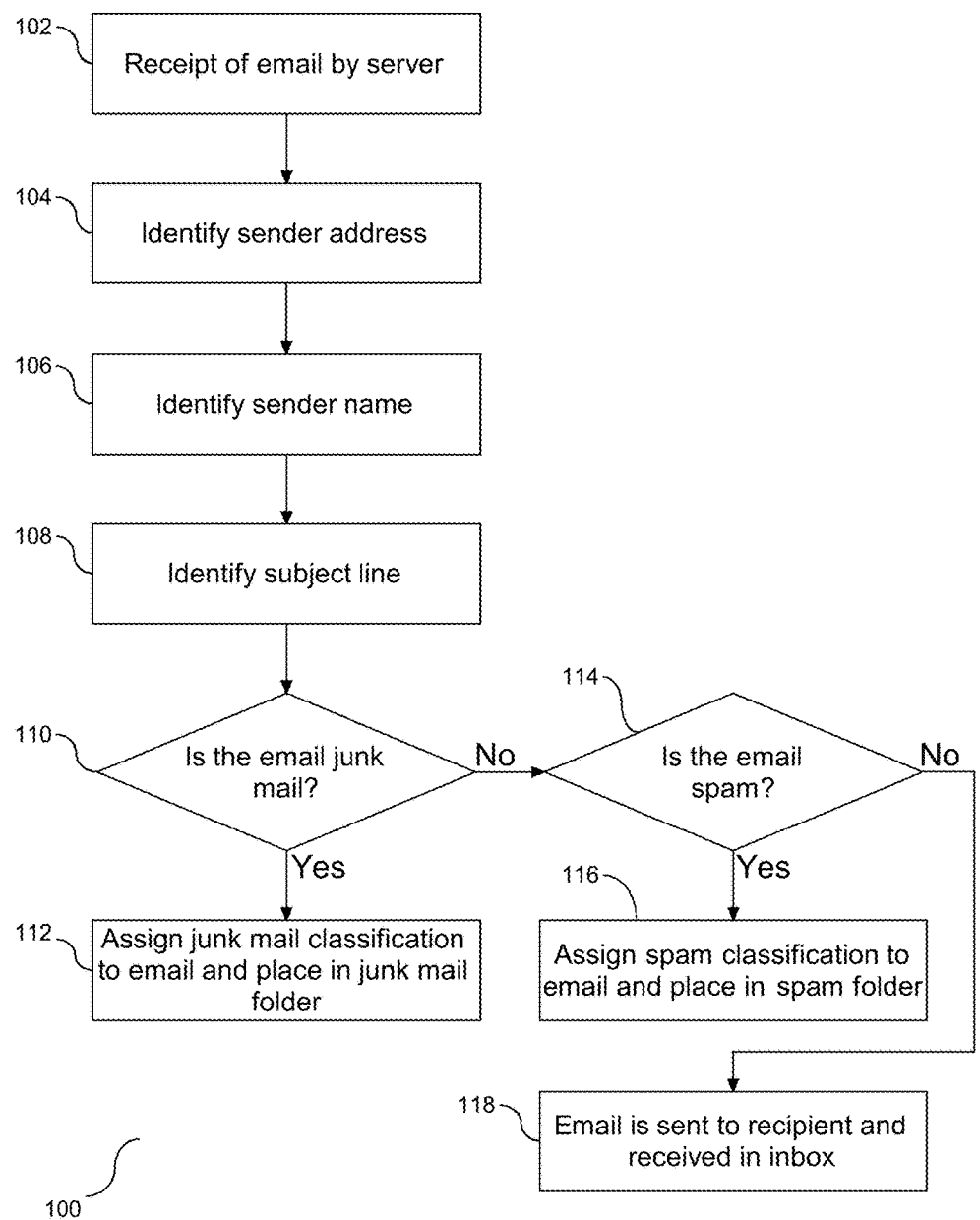
FIG. 1 is a prior art flow chart illustrating processing of electronic mail messages to separate solicited and unsolicited messages.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional units described in this specification have been labeled as a manager. A manager may be implemented in programmable hardware devices such as field programmable gate arrays, programmable array logic, programmable logic devices, or the like. The manager may also be implemented in software for execution by various types of processors. An identified manager of executable code may, for instance, comprise one or more physical or logical blocks of computer instructions which may, for instance, be organized as an object, procedure, function, or other construct. Nevertheless, the executables of an identified manager need not be physically located together, but may comprise disparate instructions stored in different locations which, when joined logically together, comprise the manager and achieve the stated purpose of the manager.

Indeed, a manager of executable code could be a single instruction, or many instructions, and may even be distributed over several different code segments, among different applications, and across several memory devices. Similarly, operational data may be identified and illustrated herein within the manager, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of recovery manager, authentication module, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

In the following description of the embodiments, reference is made to the accompanying drawings that form a part hereof, and which shows by way of illustration the specific embodiment in which the invention may be practiced. It is to be understood that other embodiments may be utilized because structural changes may be made without departing form the scope of the present invention.

Electronic mail messages are forwarded to a recipient once the message is determined not to be a junk mail message or an unsolicited message. However, the prior art filters that address issues with respect to unsolicited message are merely filters, and do not address assigning any categorization to the received message, hereinafter referred to as a solicited message. As technology evolves, electronic communications are becoming more commonplace and there is an abundance of electronic communication. It is therefore important to ensure that email message pertaining to work-related communications and/or urgent matters are communicated in such a manner and differentiated from other forms of solicited messages that do not have an urgency associated therewith.

Figure 2:
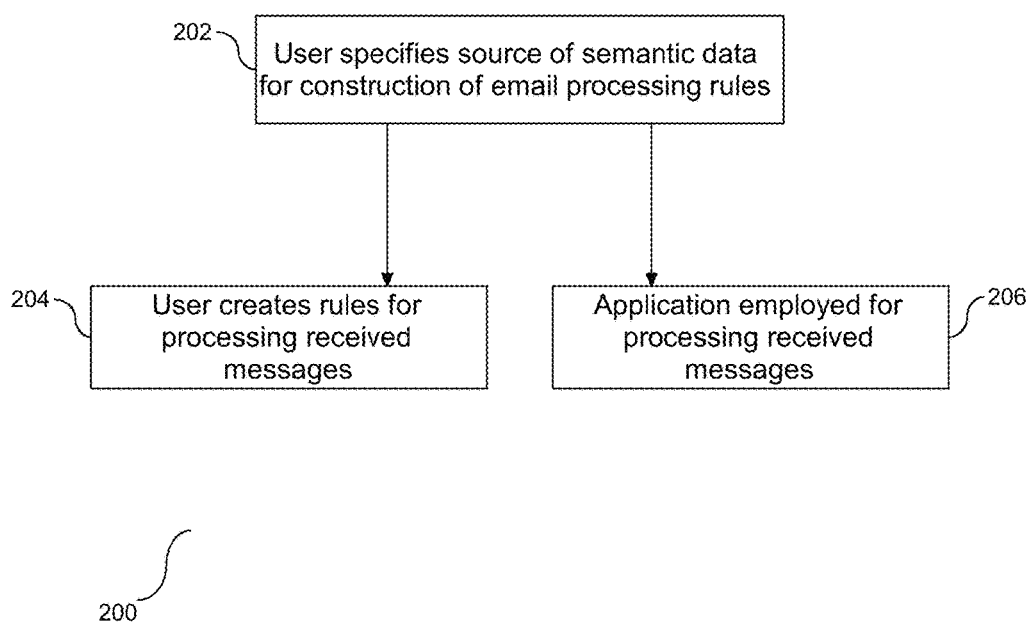
FIG. 2 is a flow chart illustrating a process for configuring a structure for categorizing messages.

A data structure is employed to address the relationship of the recipient to the sender. One or more rules are employed with the data structure, with the rules designating a manner in which received solicited messages are conveyed to the recipient. FIG. 2 is a flow chart (200) illustrating a process for configuring a structure for categorizing messages. Initially, a user specifies a source of semantic data to be used in constructing email processing rules (202). In one embodiment, the source specification consists of entering the location of the data. Similarly, in one embodiment if the data requires authentication, then the user name and password are provided together with the location of the data. The user may create rules for processing received messages (204), or employ an application, such as an organizational chart or data, for processing received messages and provide rules for processing received messages responsive to the organizational chart (206). The organizational chart may be stored in an external database or available from an external server. In one embodiment, the chart may be stored in a Lightweight Directory Access Protocol (LDAP) database or a relational database system. In one embodiment, there may be two separate bodies of rules, one body for processing messages responsive to the organizational chart, and a second body for processing messages from recipients that are not within the organization chart. There are a variety of rules that may be employed for processing received messages. Examples of processing rules responsive to the organization, include but are not limited to: playing a specific alert is a message is received from a sender at a specified level in the organization, forward the message to a secondary location if the message is received from a sender at a specified level in the organization, emit a secondary tone when a message is received from a sender external to the organization. Following either of steps (204) or (206), the rules for processing received message are stored in a data storage medium. Accordingly, rules for processing received messages may be employed in conjunction with or separate from the organizational chart.

Figure 3:
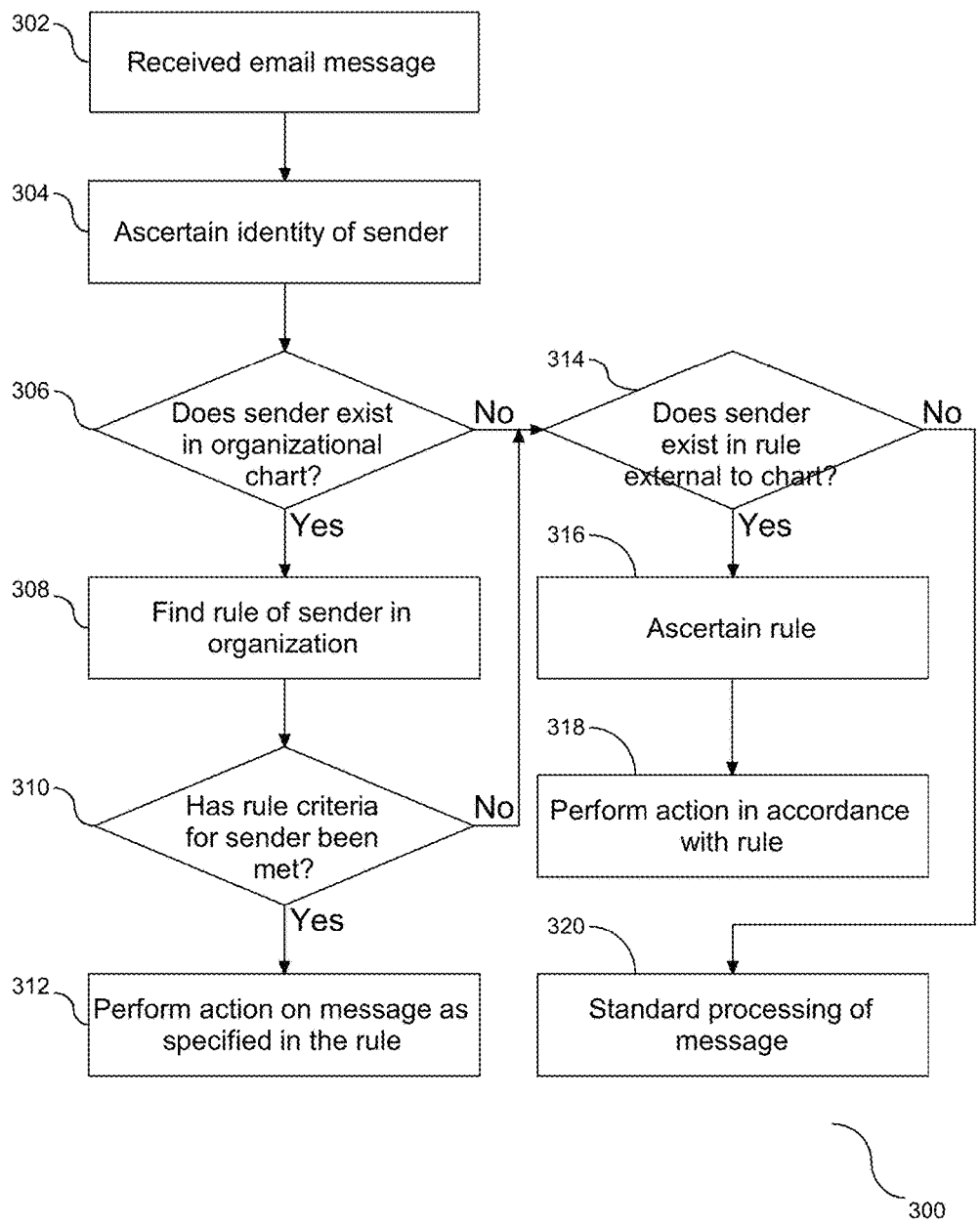
FIG. 3 is a flow chart processing received email messages responsive to rules established for senders within an organizational chart and rules established for senders external to the organizational chart, according to the preferred embodiment of this invention, and is suggested for printing on the first page of the issued patent.

Email messages may be received from senders within the organizational chart or senders external to the organizational chart. As illustrated above, rules may be configured for senders within an organization and/or senders external to the organization. FIG. 3 is a flow chart (300) illustrating processing received email messages responsive to rules established for senders within an organizational chart and rules established for senders external to the organizational chart. In response to receipt of an email message (302), the identity of the sender is ascertained (304). It is then determined if the sender exists within the recipient's organization (306). Responsive to a positive determination, the role of the sender in the organization is found based on their email address (308). It is then determined if a rule criteria for the sender has been met (310). A positive response to the determination at step (310) is followed by performing an action on the message as specified in the rule (312). Conversely, a negative response to the determination at steps (306) or (310) is followed by ascertaining if the sender exists within a set of rules established for messages received from a sender external to the organizational chart (314). A positive response to the determination at step (314) is followed by ascertaining the rule (316), and performing an action on the email message in accordance with the rule (318), and a negative response to the determination at step (314) is followed by standard processing of the message (318). More specifically, if there is no rule associated with the sender of the message, then the message proceeds with standard processing for receipt by the recipient.

In each of the above embodiments, an application queries relationship information required to resolve and enforce the email rules as established by the recipient. When an email message arrives, the application determines if the message meets the criteria of any existing rule, and if the criterion is met, performs an action associated with the rule. There are vast embodiments of actions that may be performed in accordance with one or more rules. The following are examples of the application processing a received email message:

Example 1

Rule: Send alert message to recipient when message is received from manager.

In response to receipt of a message, the application ascertains the current organizational record from storage, and retrieves identification information for the manager from the record. In one embodiment, the identification information is the email address of the manager obtained from the company's organizational chart software or database. If the address of the message matches the address in the record, then an action associated with a rule is performed on the message.

Example 2

Rule: Perform an action when email arrives from anyone chain-of-command of recipient.

In response to receipt of a message, the application ascertains the current organizational record from storage, and retrieves identification information for the manager from the record. In one embodiment, the identification information is the email address of the manager. If the address of the manager matches the address of the sender, then an action associated with a rule is performed on the message. Conversely, if the addresses do not match, the manager record data is set to the manager of the current manager, and the reset address is compared to that of the sender. The process continues until a match is obtained. In one embodiment, the rule may be set to restrict the quantity of levels that may be incremented so as to mitigate the quantity of email message from the head of the organization from tripping this rule.

Example 3

Rule: Perform action when message is received from a member of the recipient's department In response to receipt of a message, the application ascertains the current organizational record from storage, and retrieves identification information for all individuals at the same level as the recipient ("peers"). The email address of all peers in the organization is retrieved and a determination is made if the sender's email address matches someone in the recipient's department. If a match results, the action associated with the rule is performed on the message. Conversely, if no match is found, the message is checked to determine if any rule for senders external to the recipient's organization match this sender's identifying information.

Example 4

Rule: Send alert when email message received from outside of the organization

In response to receipt of a message, the application extracts the domain name from both the sender's and recipient's email addresses. If the domain names match, then the process of identifying the role within the organization is initiated. Conversely, if the domain names do not match, then an action is performed on the message responsive to the one or more rules established for messages received from an entity external to the recipient's organization. The authoritative source for semantic information may be a common professional organization, e.g. Association of Computing Machinery, a person with common 'friends' in a social networking site, e.g. Facebook® or MySpace®, or common membership in a trade union, e.g. Teamsters or United Auto Workers unions. Although these are example sources of semantic information, there is no limit to how the sender and recipient may be semantically linked.

The rules that are created and employed are based upon the semantic relationship between the sender and the recipient, and are not a pattern matching exercise. Rules may be employed in response to an organizational chart, such as a hierarchical management structure with a business organization. In one embodiment, the source of the semantic information may be external to the business organization, such as a professional relationship database, a social network site, etc. Regardless of the structure of the organization, the application queries the relationship information required to resolve and enforce the rules as established by the recipient.

Figure 4:
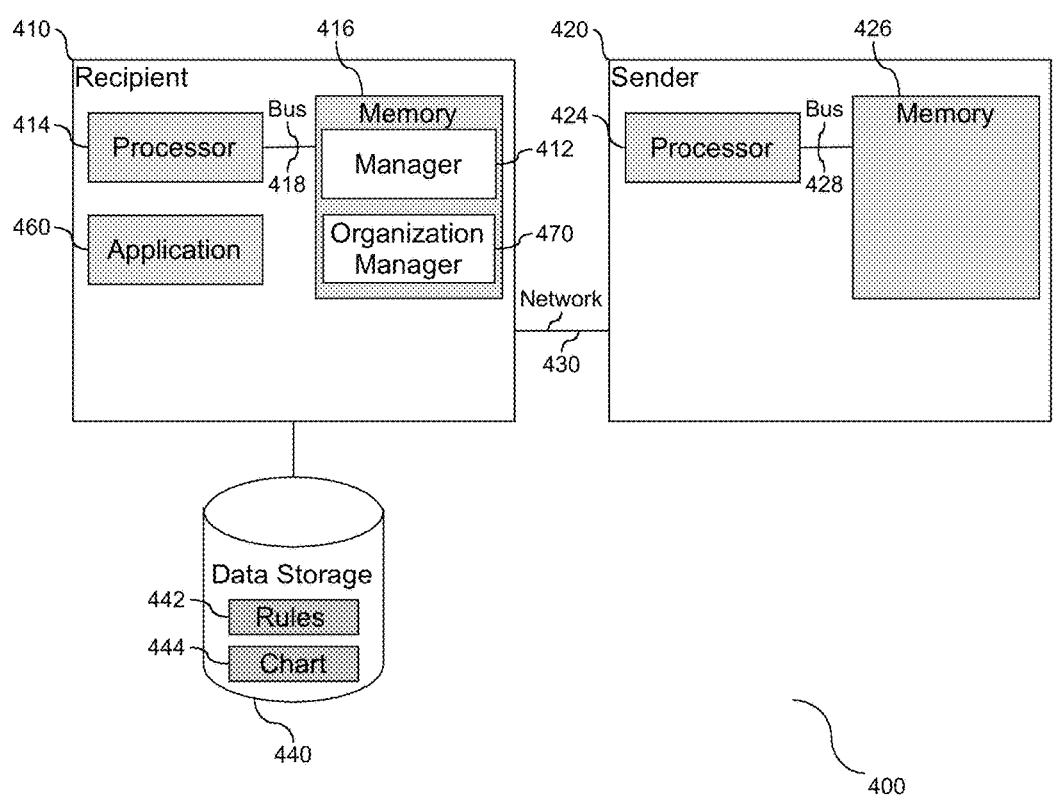
FIG. 4 is a block diagram of a computer system employed for processing messages responsive to a set of rules.

To further illustrate the invention, FIG. 4 is a block diagram of a computer system (400) having a recipient computer (410) provided with a processor unit (414) in communication with memory (416) across a bus (418), and a sender computer (420) provided with a processor unit (424) in communication with memory (426) across a bus (428). Although only one processor unit it shown herein in both the recipient and sender computers (410) and (420), respectively, the invention should not be limited to a single processor unit. In one embodiment, the sender (420) and recipient (410) may individually be configured with multiple processor units. The recipient (410) and sender (420) are in communication across a network (430). To address processing of email messages, the recipient computer (410) is configured in communication with data storage (440). A set of rules (442) are maintained local to the data storage (440) and in communication with the recipient. The rules (442) identify a semantic relationship between the sender of a message and the recipient of the message. To process the message, the recipient (410) is configured with a manager (412), which processes the message(s) based upon the set of rules (442) maintained in storage (440) and prior to communication of the message to a user interface of the recipient (410). In one embodiment, the manager (412) notifies the recipient through a user interface in response to a corresponding rule in the set of rules (442).

As noted above, a set of rules (442) are employed for addressing the relationship of the sender to the recipient, and processing the message responsive to the relationship. In one embodiment, an application (460) is provided local to the recipient to enable the recipient to specify a source of semantic data to be used in constructing electronic mail processing rules. Similarly, in one embodiment, an organization chart (444) is provided local to data storage (440) and is employed to establish a relationship between the sender and the recipient, and a corresponding set of organization rules (446) associated with the chart (444) are provided based upon a hierarchical structure of the organization chart. With respect to the organization and the embedded structure, an organization manager (470) may be provided to mediate communication of electronic mail message processing rules based upon the organization chart. It is known in the art that organizations are commonly constructed based upon hierarchical relationships. The manager (412) may be employed to forward the message to a portable electronic mail interface or electronic pager when the sender is at a higher level in the hierarchical structure from the recipient.

As shown herein, the managers are shown as software tools local to memory of the recipient (410). However, the invention should not be limited to software embodiments. More specifically, in one embodiment the managers may be hardware tools embedded within the system and external to memory to support the functionality of email message processing. Accordingly, the managers shown herein may be configured as software tools, hardware tools, or a combination thereof.

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EEPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening non-public or public networks.

The software implementation can take the form of a computer program product accessible from a computer-useable or computer-readable medium providing program code for use by or in connection with a computer or any instruction execution system.

Multi-dimensional categorization and processing of email messages are provided. A set of rules is employed to process solicited email messages. The received message is processed through the set of rules, and in response to the rules is forwarded to the recipient in conformance with one or more rules that match the criteria of the message. The rules may be provided in association with an organization, or the rules may be independently configured to meet the needs of the recipient. Regardless of how the rules are formed, each message is processed through the rules and then communicated to the recipient in conformance with the rules.

It will be appreciated that, although specific embodiments of the invention have been described herein for purposes of illustration, various modifications may be made without departing from the spirit and scope of the invention. In particular, future sources of semantic relationship information may provide a more sophisticated mechanism for automated processing of e-mail messages. Accordingly, the scope of protection of this invention is limited only by the following claims and their equivalents.

I claim:

1. A computer system comprising:
   a processor in communication with memory;
   an application in communication with the processor, the application to:
      specify a source of semantic data; and
      construct a set of electronic mail processing rules for the specified source, including a first set of rules and a second set of rules, the first sets based on an internal relationship to an organization and a second set based on an external relationship to the organization;
   a manager in communication with the processor, the manager to:
      receive an electronic mail message;
      process the received message based upon the constructed sets of rules, wherein the sets of rules is based upon a semantic relationship derived from the received message, and wherein processing the received message comprises the manager to:
         ascertain a property derived from the received message, and apply the first set of rules to the ascertained property;
         in response to determining that the ascertained property is associated with the first set of rules, process the received message corresponding to at least one rule in the first set of rules; and
         in response to determining that the ascertained property is not associated with the first set of rules, process the received message corresponding to at least one rule in the second set of rules; and
      communicate the received message to a recipient based on at least one rule.

2. The system of claim 1, further comprising an application to specify a source of semantic data to derive the semantic relationship from the received message.

3. The system of claim 1, wherein the first set of rules is associated with a first source comprising an organization chart, and wherein determining that the ascertained property is associated with the first set of rules comprises the manager to establish a relationship between the ascertained property and the organization chart.

4. The system of claim 3, wherein the first set of rules is based upon a hierarchical structure of the organization chart.

5. The system of claim 4, further comprising an organization manager to mediate communication of the first set of rules based upon the organization chart.

6. The system of claim 4, further comprising the manager to forward the received message to a portable electronic mail interface when a sender of the received message is at a higher tier in the hierarchical structure than the recipient.

7. The system of claim 1, further comprising the manager to extract an originating address of the received message in response to determining that the ascertained property is associated with the first set of rules, and to determine a characteristic of a sender of the received message based on the extracted address.

8. The method of claim 1, further comprising extracting an originating address of the received message in response to determining that the ascertained property is associated with the first set of rules, and determining a characteristic of a sender of the received message based on the extracted address.

9. A computer implemented method for processing electronic communication comprising:
   specifying a source of semantic data, and constructing a set of electronic mail processing rules for the specified source, including a first set of rules and a second set of rules, the first sets based on an internal relationship to an organization and a second set based on an external relationship to the organization;
   receiving an electronic mail message;
   processing the received message based upon the constructed sets of rules, wherein the sets of rules is based upon a semantic relationship derived from the received message, and wherein processing the received message comprises:
      ascertaining a property of the message derived from the received message, and apply the first sets of rules to the ascertained property;
      in response to determining that the ascertained property is associated with the first set of rules, processing the received message corresponding to at least one rule in the first set of rules; and
      in response to determining that the ascertained property is not associated with the first set of rules, processing the received message corresponding to at least one rule in the second set of rules; and
   communicating the received message to a recipient based on the at least one rule.

10. The method of claim 9, further comprising specifying a source of semantic data to derive the semantic relationship from the received message.

11. The method of claim 10, wherein the first set of rules is associated with a first source comprising an organization chart, and wherein determining that the ascertained property is associated with the first set of rules comprises establishing a relationship between the ascertained property and the organization chart.

12. The method of claim 11, wherein the first set of rules is based upon a hierarchical structure of the organization chart.

13. The method of claim 12, further comprising mediating communication the first set of rules based upon the organization chart.

14. The method of claim 12, further comprising forwarding the received message to a portable electronic mail interface when a sender of the received message is at a higher tier in the hierarchical structure than the recipient.

15. A computer program product comprising a computer-readable storage device having computer readable program code embodied therewith, the program code when executed by a processor to:
   specify a source of semantic data, and construct a set of electronic mail processing rules for the specified source including a first set of rules and a second set of rules, the first sets based on an internal relationship to an organization and a second set based on an external relationship to the organization;

receive an electronic mail message;

process the received message based upon the constructed sets of rules, wherein the sets of rules is based upon a semantic relationship derived from the received message, and wherein processing the received message comprises program code to:

ascertain a property of the message derived from the received message, and apply the first set of the ascertained property;

in response to determining that the ascertained property is associated with the first set of rules, process the received message corresponding to at least one rule in the first set of rules; and in response to determining that the ascertained property is not associated with the first set of rules, process the received message corresponding to at least one rule in the second set of rules; and communicate the received message to a recipient based on at least one rule.

16. The computer program product of claim 15, further comprising program code to specify a source of semantic data to derive the semantic relationship from the received message.

17. The computer program product of claim 15, wherein the first set of rules is associated with a first source comprising an organization chart, and wherein determining that the ascertained property is associated with the first set of rules comprises program code to establish a relationship between the ascertained property and the organization chart.

18. The computer program product of claim 17, wherein the first set of rules is based upon a hierarchical structure of the organization chart.

19. The computer program product of claim 17, further comprising program code to mediate communication of the first set of rules based upon the organization chart, and to forward the received message to a portable electronic mail interface when a sender of the received message is at a higher tier in the hierarchical structure than the recipient.

20. The computer program product of claim 15, further comprising program code to extract an originating address of the received message in response to determining that the ascertained property is associated with the first set of rules, and to determine a characteristic of a sender of the received message based on the extracted address.

\* \* \* \* \*